(12) United States Patent
Winter

(10) Patent No.: US 8,626,896 B2
(45) Date of Patent: Jan. 7, 2014

(54) SYSTEM AND METHOD OF MANAGING NETWORK CONNECTIONS USING A LINK POLICY

(75) Inventor: Robert L. Winter, Leander, TX (US)

(73) Assignee: Dell Products, LP, Round Rock, TX (US)

( * ) Notice: Subject to any disclaimer, the term of this patent is extended or adjusted under 35 U.S.C. 154(b) by 878 days.

(21) Appl. No.: 11/955,561

(22) Filed: Dec. 13, 2007

(65) Prior Publication Data

US 2009/0157865 A1    Jun. 18, 2009

(51) Int. Cl.
*G06F 15/16* (2006.01)
(52) U.S. Cl.
USPC .......................................................... 709/224
(58) Field of Classification Search
USPC .......................................................... 709/224
See application file for complete search history.

(56) References Cited

U.S. PATENT DOCUMENTS

| 2004/0257989 | A1* | 12/2004 | Lingafelt et al. | 370/230 |
| 2005/0270988 | A1* | 12/2005 | DeHaemer | 370/254 |
| 2006/0277450 | A1* | 12/2006 | Zaki et al. | 714/708 |
| 2009/0097401 | A1* | 4/2009 | Diab | 370/230 |
| 2009/0097442 | A1* | 4/2009 | Diab et al. | 370/329 |

\* cited by examiner

*Primary Examiner* — Sulaiman Nooristany
(74) *Attorney, Agent, or Firm* — Larson Newman, LLP

(57) ABSTRACT

A system and method of managing network connections using a link policy is disclosed. In one form, a network link management system can include a link control logic module operable to alter a first link data rate of a first link operable to communicate network traffic. The network link management system can also include a link manager coupled to the link control logic module. In one form, the link manager can be configured to initiate altering the first link data rate to a second link data rate value in response to a first link rate policy entry of the first link. The network link management system can also include a link rate policy accessible to the link manager and operable to store the link rate policy entry of the first link.

14 Claims, 4 Drawing Sheets

SYSTEM AND METHOD OF MANAGING NETWORK CONNECTIONS USING A LINK POLICY

FIELD OF THE DISCLOSURE

This disclosure relates generally to information handling systems, and more particularly to a system and method of managing network connections using a link policy.

BACKGROUND

As the value and use of information continues to increase, individuals and businesses seek additional ways to process and store information. One option is an information handling system. An information handling system generally processes, compiles, stores, and/or communicates information or data for business, personal, or other purposes. Because technology and information handling needs and requirements can vary between different applications, information handling systems can also vary regarding what information is handled, how the information is handled, how much information is processed, stored, or communicated, and how quickly and efficiently the information can be processed, stored, or communicated. The variations in information handling systems allow for information handling systems to be general or configured for a specific user or specific use such as financial transaction processing, airline reservations, enterprise data storage, or global communications. In addition, information handling systems can include a variety of hardware and software components that can be configured to process, store, and communicate information and can include one or more computer systems, data storage systems, and networking systems.

BRIEF DESCRIPTION OF THE DRAWINGS

It will be appreciated that for simplicity and clarity of illustration, elements illustrated in the Figures have not necessarily been drawn to scale. For example, the dimensions of some of the elements are exaggerated relative to other elements. Embodiments incorporating teachings of the present disclosure are shown and described with respect to the drawings presented herein, in which.

The use of the same reference symbols in different drawings indicates similar or identical items.

DETAILED DESCRIPTION OF DRAWINGS

Figure 1:
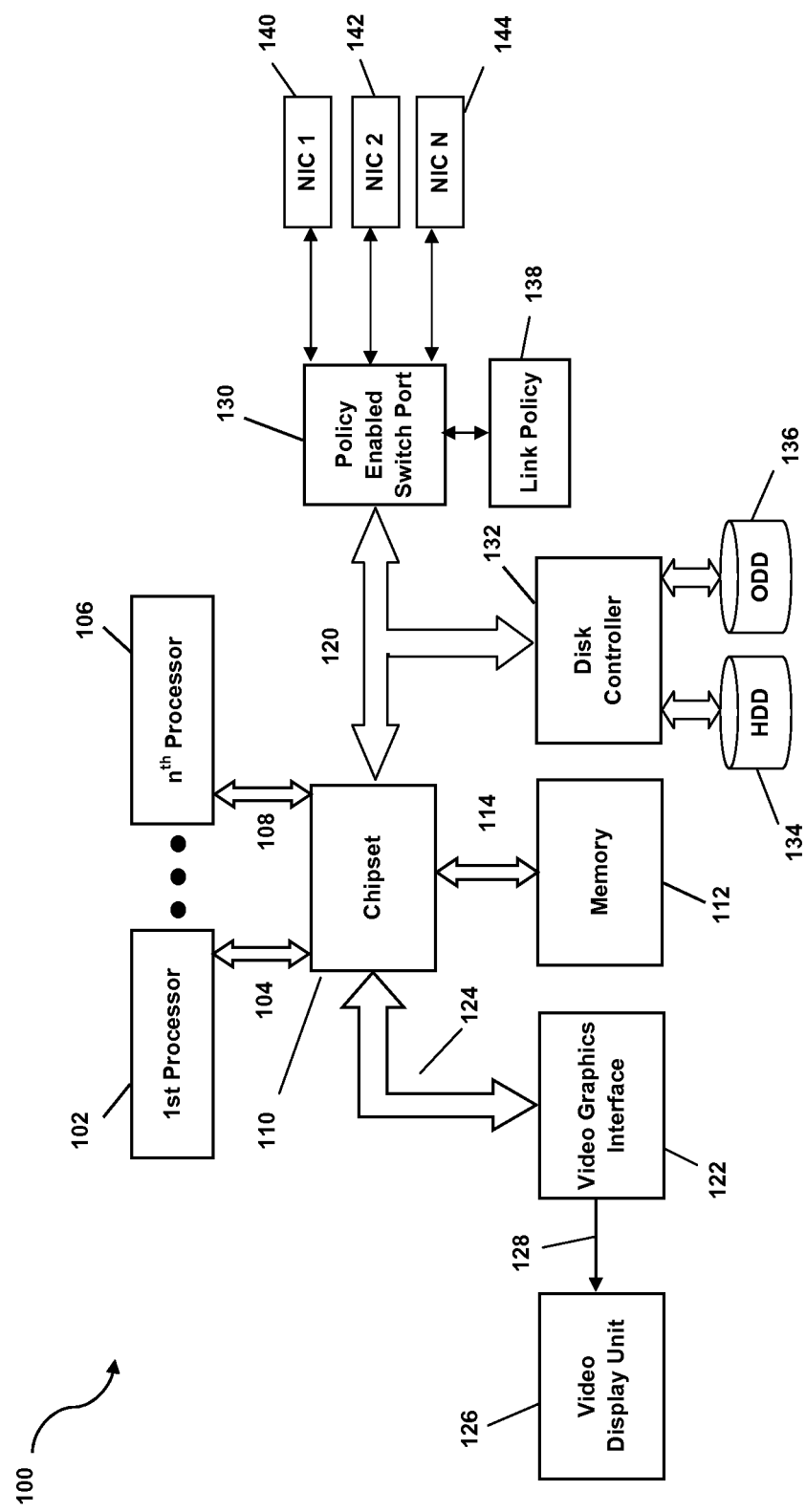
FIG. 1 illustrates a block diagram of an information handling system according to one aspect of the disclosure.

The following description in combination with the Figures is provided to assist in understanding the teachings disclosed herein. The following discussion will focus on specific implementations and embodiments of the teachings. This focus is provided to assist in describing the teachings and should not be interpreted as a limitation on the scope or applicability of the teachings. However, other teachings can certainly be utilized in this application. The teachings can also be utilized in other applications and with several different types of architectures such as distributed computing architectures, client/server architectures, or middleware server architectures and associated components.

For purposes of this disclosure, an information handling system can include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system can be a personal computer, a PDA, a consumer electronic device, a wireless communication device, a diskless computer system, a thin client, a network server or storage device, a switch router, wireless router, or other network communication device, or any other suitable device and can vary in size, shape, performance, functionality, and price. The information handling system can include memory, one or more processing resources such as a central processing unit (CPU) or hardware or software control logic. Additional components of the information handling system can include one or more storage devices, one or more communications ports for communicating with external devices as well as various input and output (I/O) devices, such as a keyboard, a mouse, and a video display. The information handling system can also include one or more buses operable to transmit communications between the various hardware components.

According to one aspect of the disclosure, a network link management system is disclosed. The network link management system can include a link control logic module operable to alter a first link data rate of a first link operable to communicate network traffic. The network link management system can also include a link manager coupled to the link control logic module. In one form, the link manager can be configured to initiate altering the first link data rate to a second link data rate value in response to a first link rate policy entry of the first link. The network link management system can also include a link rate policy accessible to the link manager and operable to store the link rate policy entry of the first link.

According to another aspect of the disclosure, a method of managing network links is disclosed. The method can include accessing a link policy of a communication device operable to enable use of a first link, and detecting a current usage rate of the first link using a link monitor. The method can also include detecting a first link data rate entry of the first link within the link policy, and comparing the first link data rate entry to the current usage rate. The method can further include updating the link data rate of the first link to an updated link data rate in response to the comparison.

According to a further aspect of the disclosure, an information handling system is disclosed. The information handling system can include a communication device operable to be coupled to a communication network. In one form, the communication device operable to establish a first link at using one of a plurality of data rates. The information handling system can also include a link manager configured to initiate altering a first data rate to a second data rate in response to a link rate policy of the first link. The information handling system can further include a link monitor coupled to the link manager and operable to detect a current usage of the first link, and a link control logic module operable to alter the first data rate of the first link to the second data rate.

FIG. 1 illustrates a block diagram of an exemplary embodiment of an information handling system, generally designated at 100. In one form, the information handling system 100 can be a computer system such as a server. As shown in FIG. 1, the information handling system 100 can include a first physical processor 102 coupled to a first host bus 104 and can further include additional processors generally designated as n$^{th}$ physical processor 106 coupled to a second host bus 108. The first physical processor 102 can be coupled to a chipset 110 via the first host bus 104. Further, the n$^{th}$ physical processor 106 can be coupled to the chipset 110 via the second host bus 108. The chipset 110 can support multiple processors and can allow for simultaneous processing of multiple processors and support the exchange of information within information handling system 100 during multiple processing operations.

According to one aspect, the chipset 110 can be referred to as a memory hub or a memory controller. For example, the chipset 110 can include a dedicated bus to transfer data between first physical processor 102 and the n$^{th}$ physical processor 106. For example, the chipset 110 including a chipset that can include a memory controller hub and an input/output (I/O) controller hub. As a memory controller hub, the chipset 110 can function to access the first physical processor 102 using first bus 104 and the n$^{th}$ physical processor 106 using the second host bus 108. The chipset 110 can also be used as a memory interface for accessing memory 112 using a memory bus 114. In a particular embodiment, the buses 104, 108, and 114 can be individual buses or part of the same bus. The chipset 110 can also include bus control and can handle transfers between the buses 104, 108, and 114. Memory 112 includes machine-executable code that can be performed by first physical processor 102 or by n$^{th}$ physical processor 106. A non-limiting example of memory 112 includes random access memory (RAM), read-only memory (ROM), another non-transitory medium, or a combination thereof.

According to another aspect, the chipset 110 can include an application specific chipset that connects to various buses, and integrates other system functions. For example, the chipset 110 can include using an Intel® Hub Architecture (IHA) chipset that can also include two parts, a Graphics and AGP Memory Controller Hub (GMCH) and an I/O Controller Hub (ICH). For example, an Intel 820E, an 815E chipset, an Intel 975X chipset, an Intel G965 chipset, available from the Intel Corporation of Santa Clara, Calif., or any combination thereof, can be used as at least a portion of the chipset 110. The chipset 110 can also be packaged as an application specific integrated circuit (ASIC).

In one form, the chipset 110 can be coupled to a video graphics interface 122 using a third bus 124. In one form, the video graphics interface 122 can be a Peripheral Component Interconnect (PCI) Express interface operable to content to display within a video display unit 126. Other graphics interfaces may also be used. The video graphics interface 122 can output a video display output 128 to the video display unit 126. The video display unit 126 can include one or more types of video displays such as a flat panel display (FPD), cathode ray tube display (CRT) or other type of display device.

The information handling system 100 can also include an I/O interface 130 that can be connected via an I/O bus 120 to the chipset 110. The I/O interface 130 and I/O bus 120 can include industry standard buses or proprietary buses and respective interfaces or controllers. For example, the I/O bus 120 can also include a PCI bus or a high speed PCI-Express bus. In one embodiment, a PCI bus can be operated at approximately 66 MHz and a PCI-Express bus can be operated at more than one (1) speed (e.g. 2.5 GHz and 5 GHz). PCI buses and PCI-Express buses can comply with industry standards for connecting and communicating between various PCI-enabled hardware devices. Other buses can also be used in association with, or independent of, the I/O bus 120 including, but not limited to, industry standard buses or proprietary buses, such as Industry Standard Architecture (ISA), Small Computer Serial Interface (SCSI), Inter-Integrated Circuit (I$^2$C), System Packet Interface (SPI), or Universal Serial buses (USBs).

In an alternate embodiment, the chipset 110 can be a chipset employing a Northbridge/Southbridge chipset configuration (not illustrated). For example, a Northbridge portion of the chipset 110 can communicate with the first physical processor 102 and can control interaction with the memory 112, the I/O bus 120 that can be operable as a PCI bus, and activities for the video graphics interface 122. The Northbridge portion can also communicate with the first physical processor 102 using first bus 104 and the second bus 108 coupled to the n$^{th}$ physical processor 106. The chipset 110 can also include a Southbridge portion (not illustrated) of the chipset 110 and can handle I/O functions of the chipset 110. The Southbridge portion can manage the basic forms of I/O such as Universal Serial Bus (USB), serial I/O, audio outputs, Integrated Drive Electronics (IDE), and ISA I/O for the information handling system 100.

The information handling system 100 can further include a disk controller 132 coupled to the I/O bus 120, and connecting one or more internal disk drives such as a hard disk drive (HDD) 134 and an optical disk drive (ODD) 136 such as a Read/Write Compact Disk (R/W CD), a Read/Write Digital Video Disk (R/W DVD), a Read/Write mini-Digital Video Disk (R/W mini-DVD), or other type of optical disk drive.

The information handling system 100 can also include a link manager 130 operable to be coupled to one or more of a first network interface controller (NIC) 140, a second NIC 142, an n$^{th}$ NIC, or any combination thereof. In one form, one or more of the NICs can be configured as a network interface card can operate more than one data rate. For example, one or more of the NICs can be operated at a first speed of 10 Gbps and can further be operated at a second speed of 1 Gbps. The link manager 130 can be coupled to a link policy 138 that stores policy information to control data rates of each of the NICs. The link policy 138 can be stored internal or external to the link manager 130.

According to one aspect, one or more of the NICs can be operable as an Energy Efficient Ethernet (EEE) controller. As such, the link manager 130 can control data rates of a specific NIC using the link policy 138. For example, the first NIC 140 can be operable as an EEE controller, operable to communicate at 1 Gbps and 10 Gbps. The link manager 130 can monitor network traffic of the first NIC 140 and alter a data rate of the first NIC 140 using the link policy information. For example, during periods of low network traffic, the link manager 130 can access the link policy 138 and determine a data rate to set the first NIC 140 (e.g. 1 Gbps). In this manner, power consumption of the first NIC 140 can be reduced during low data rate periods. Additionally, as network traffic of the first NIC 140 increases, the link manager 130 can detect the increase and access the link policy 138 to determine an updated data rate of the first NIC 140 (e.g. 5 Gbps, 10 Gbps, etc.). As such, the link manager 130 can alter data rates of one or more of the NICs in response to network traffic and the link policy 138 of each NIC.

Figure 2:
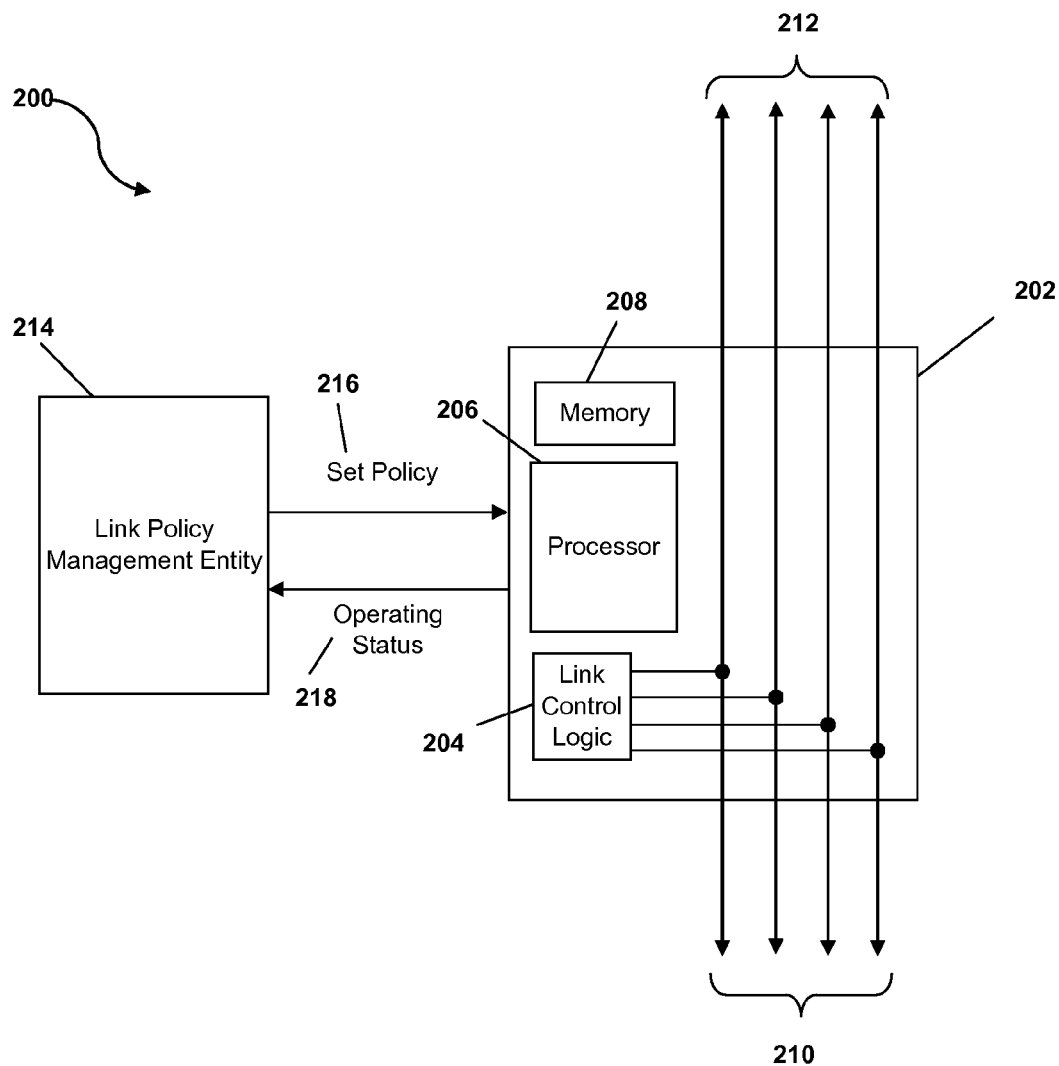
FIG. 2 illustrates a functional block diagram of link management system according to another aspect of the disclosure.

FIG. 2 illustrates a functional block diagram of link management system, illustrated generally at 200, according to one aspect of the disclosure. The link manager 202 can include a link control logic 204, a processor 206, and a memory 208. The link manager 202 can be used to control data rates of a first set of links 210 and a second set of links 212. Though illustrated as a single line link, it should be understood that each can link include one or more data transmission lines.

Additionally, the link control logic 204 can further include one or more data transmission lines, communication interfaces, etc. as needed or desired, to control that data rate of the first set links 210. The link control logic 204 can also be used to control the data rates of a second set of links 212.

The link management system 200 can also include a link policy management entity 214 operable to set link policy 216 of the link manager 202. The link policy management entity can 214 can also receive an operating status 218 of the link manager 202. In one form, the link policy management entity 214 can publish or send a policy to the link manager 202 that includes a link policy to be employed by the link manager 202. The policy can also include information other than the link policy information and the processor 206 can update and store the link policy information within the memory 208. As such, during operation, the processor 206 can employ the link policy information stored within the memory, and the link control logic 204, to control data rates of one or more links within the first set of links 210, the second set of links 212, or any combination thereof.

Figure 3:
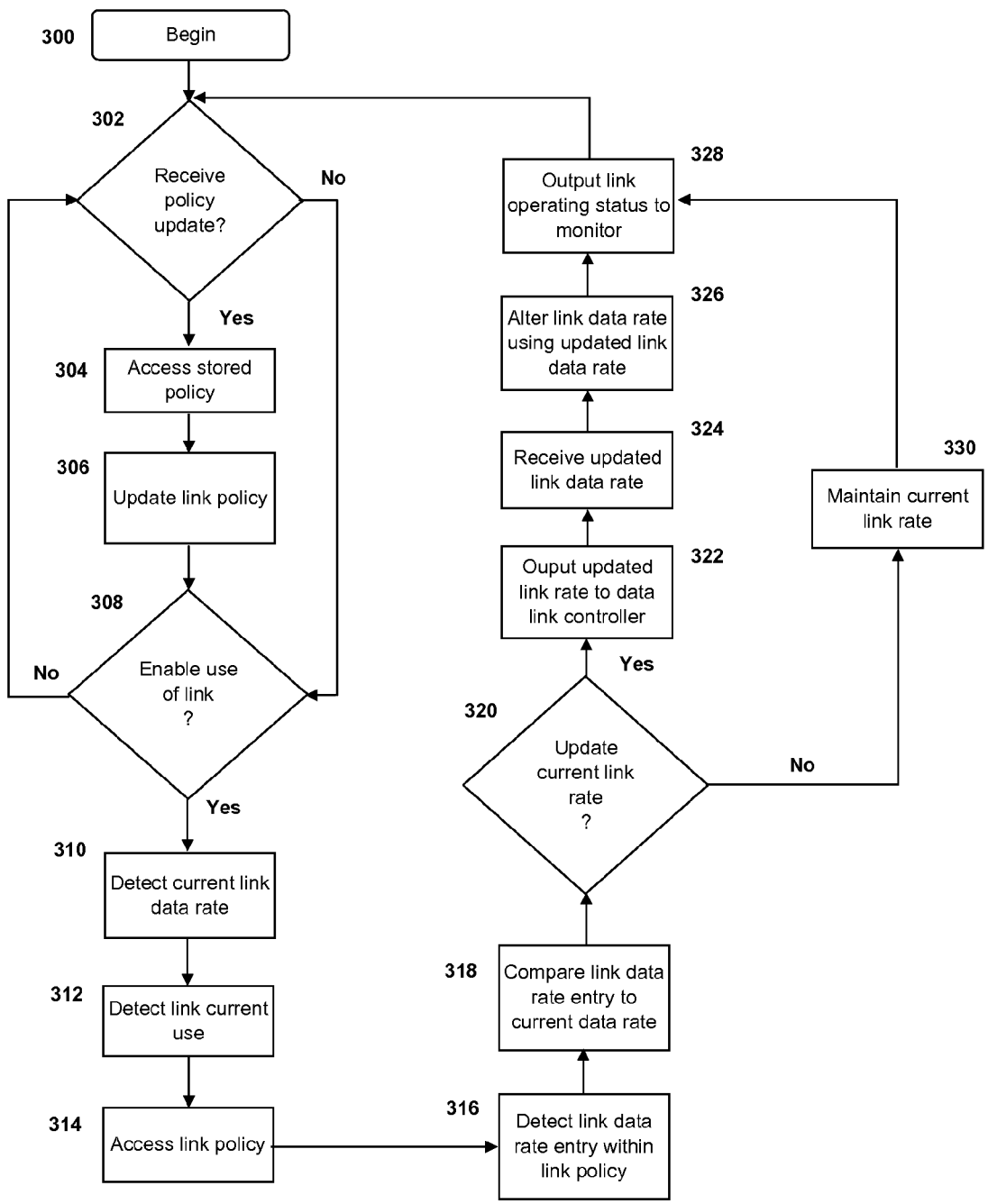
FIG. 3 illustrates a flow diagram of a method of managing network links using a policy according to a one aspect of the disclosure.

FIG. 3 illustrates a flow diagram of a method of managing network links using a policy according to a one aspect of the disclosure. FIG. 3 can be employed in whole, or in part, by the information handling system 100 described in FIG. 1, the link management system 200 described in FIG. 2, the link management system described in FIG. 4, or any other type of system, controller, device, module, processor, or any combination thereof, operable to employ all, or portions of, the method of FIG. 3. Additionally, the method can be embodied in various types of encoded logic including software, firmware, hardware, or other forms of digital storage mediums, computer readable mediums, or logic, or any combination thereof, operable to provide all, or portions, of the method of FIG. 3.

The method begins generally at block 300. At decision block 302, a policy update can be received. In one form, the policy update can include a link policy that can include link rate values to operate one or more links. For example, one or references to data links, such as an EEE enabled links or other variable data rate links, can be included within the policy update to operate the one or more data links at one or more data rates. If at decision block 302, a policy update may not be received, the method can proceed to decision block 308 as described below. If at decision block 302, a policy update may be received, the method can proceed to block 304 and a stored policy can be accessed. In one form, a stored policy can be stored within a memory device or other form of data storage device. According to one aspect, a policy may be updated or provided for the first time and as such may not be currently stored and accessed. The method can then proceed to block 306 and the link policy can be updated. For example, a communication device can include a policy that includes various types of operating parameters to operate the device. As such, the policy can include a link policy information, parameters, values, or other types of information, to operate one or more data links of the communication device. In another form, the communication or other device can store a link policy separate from other policies as needed or desired.

Upon updating the link policy, the method can proceed to decision block 308 and determines whether to enable use of a link. If link should not be enabled, or operation modified, the method can proceed to block 302 as described above. If at decision block 308 a link should be enabled or operation should be modified, the method can proceed to block 310 and the current link data rate can be detected. For example, a current link data rate can be set to 10 Gbps or another value.

The method can then proceed to block 312 and detects a current link use. For example, a link monitor can be used to detect the current utilization of a link, such as idle, 500 Kbps, 1 Gbps, 5 Gbps, etc. The method can then proceed to block 314, and a link policy can be accessed, and to block 316 where a link data rate entry of the data link can be detected. For example, the link policy can include multiple entries to be used by multiple links. Upon detecting a link data rate entry to be used by the data link, the method can then proceed to block 318 and compares the link data rate entry to the current data rate. The method can then proceed to decision block 320, determines if the current link rate should be updated. If the current link rate should not be updated, the method can proceed to block 330 and the current link rate can be maintained. The method can then proceed to block 328 as described below. If at decision block 320, the current link rate should be updated, the method can proceed to block 322 and the updated link rate can be output to a link controller. In one embodiment, a link controller can include logic to alter a data rate of a link. In other forms, link control logic, located internal or external to a link controller can be used to alter a data rate of a link.

Upon outputting an updated link rate, the method can proceed to bloc 324 and the updated link rate can be received at the link controller. The method can then proceed to block 326 and the link rate can be altered using the updated link rate. The method can then proceed to block 328 and a link operating status can be output to a link monitor. The method can then proceed to block 302 as described above.

Figure 4:
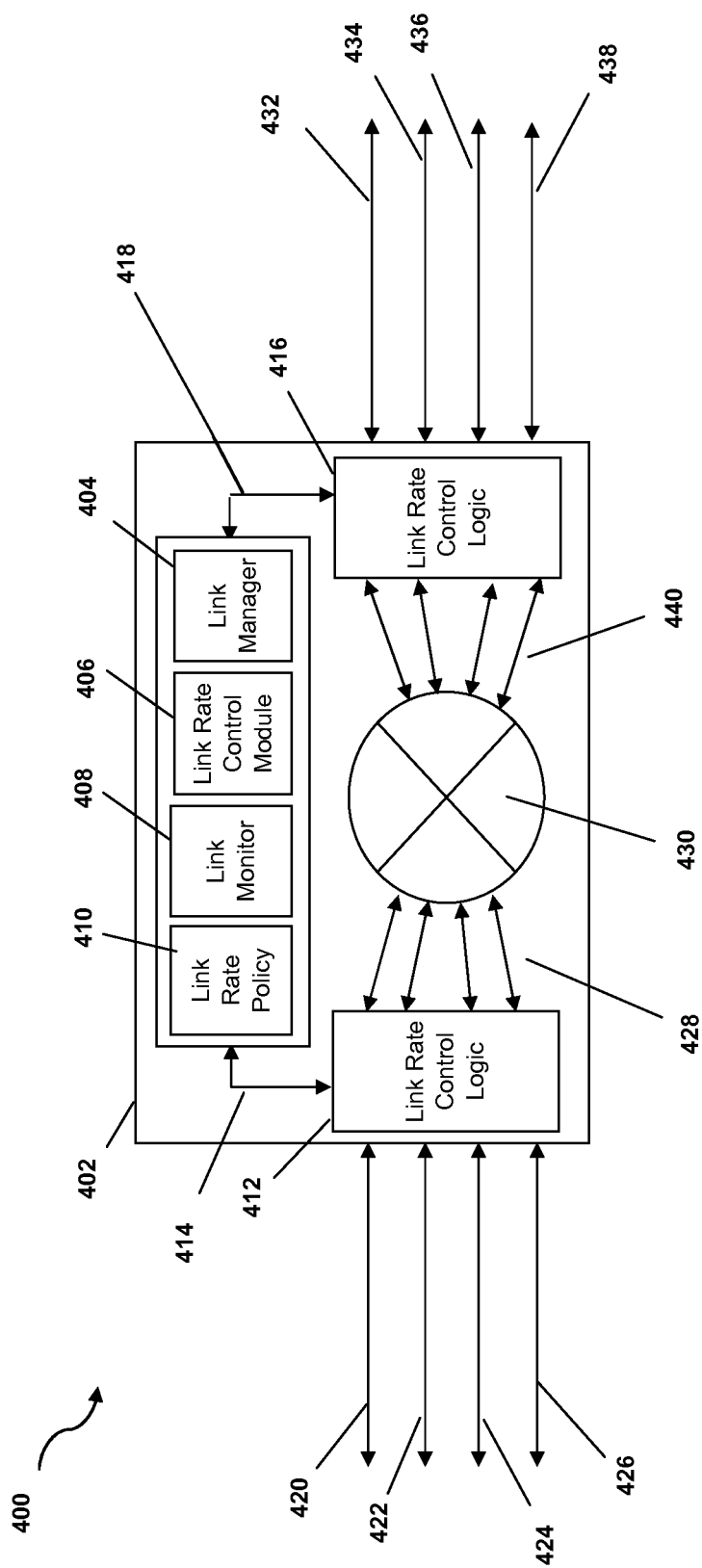
FIG. 4 illustrates a functional block diagram of network communication device employing link manager according to another aspect of the disclosure.

FIG. 4 illustrates a functional block diagram of link management system illustrated generally at 400. The link management system 400 can include a network communication device 402 including a link manager 404. The network communication device can include various types or communication of network communication devices including a hub, router, switch, network interface controller, load balancer, failover device, a gateway, a firewall, or various other types of network communication devices that can couple multiple network links.

In one form, the link manager 404 can include a link rate control module 406, a link monitor 408, and a link rate policy 410. In one from, the link rate policy 410 can be updated using a link policy update module (not illustrated) employed by link manager 404. The link manager 404 can be coupled to a first link rate control logic 412 using a first control interface 414. The link manager 404 can also be coupled to a second link rate control logic 416 using a second control interface 418. Various types of buses, communication links, control lines, etc. can be used by the first control interface 414 and the second control interface 418, including, but not limited to PCI Express, Ethernet, or proprietary inter-device communication links.

According to one aspect, the first link rate control logic 412 and the second link rate control logic 416 can be coupled to a switching module 430 operable to route data using a first group of switching links 428 and a second group of switching links 440. Additionally, the first link rate control logic 412 and the second link rate control logic 416 can be coupled to multiple data communication lines using an EEE enabled communication ports to establish a communication link at a specific data rate. In one form, the first rate control logic 412 can be used to control a first network link 420, a second network link 422, a third network link 424, an $n^{th}$ network link 426, or any combination thereof. Additionally, the second rate control logic 416 can be used to control a fourth network link 432, a fifth network link 434, a sixth network link 436, a second $n^{th}$ network link 438, or any combination thereof.

During operation, the link manager 404 can access the link rate policy 410 to determine a data rates to communication data using one or more of the network links. The link manager 404 can determine a number of links, and which links, may be coupled to the network communication device 402. The link monitor 408 can further determine a data rate to use each of the network links, and can communicate a control signal to the first link rate control logic 412 and the second link rate control logic 416, to establish a data rate of each of the links. In one form, the link rate policy 410 can include various data rate values based on a type of network connection, historical use of the network connection, current demands on the network connection or other network links, etc. Upon establishing a data rate to use at each of the links, the link monitor 408 can alter the link rate based on the network traffic at each network link. For example, the first link 420 can be set at a first data rate of 1 Gbps. As the link monitor 408 detects an increase in network traffic of the first link 420, the link monitor 408 can access the link rate policy to determine whether to increase or decrease a data rate. For example, the data rate can be increased to 10 Gbps. As the link monitor 406 detects a decrease in network traffic of the first link 420, the link manager 404 can access the link rate policy 410 and determine a reduced data rate to operate the first link 420. For example, number of network packets per second can be detected at a first link 420.

In another form, the link monitor 408 can access network traffic via the network switch module 430. For example, the network switch module 430 can couple network traffic received from the first link 420 to the fifth link 434. Additionally, the first link 420 can be operated at a higher speed than the fifth link 434. As such, the link monitor 404 can detect the difference in link speeds and can access the link rate policy 410 to determine an operating speed of the first link 420. The link manager can then alter the operating speed of the fifth link 434 using the data rate of the first link 420. In this manner, the fifth link 434 can be used in a lower data rate operation and can be altered in response to network traffic detected by the link manager 408.

Although only a few exemplary embodiments have been described in detail above, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

What is claimed is:

1. A network communication device comprising:
   a first link operable to communicate network traffic and including a first link control logic module operable to alter a first link data rate of the first link from a first data rate value to a second data rate value and to alter the first link data rate from the first data rate value to a fifth data rate value, wherein the first data rate value is higher than the second data rate value and is lower than the fifth data rate value;
   a second link operable to communicate network traffic and including a second link control logic module operable to alter a second link data rate of the second link from a third data rate value to a fourth data rate value and to alter the second link data rate from the third data rate value to a sixth data rate value, wherein the third data rate value is higher than the fourth data rate value and is lower than the sixth data rate value;
   a switch operable to couple the first link to the second link;
   a link rate control module coupled to the first and second link control logic modules, the link rate control module operable to:
      direct the first link control logic module to alter the first link data rate from the first data rate value to the second data rate value or the fifth data rate value; and
      direct the second link control logic module to alter the second link data rate from the third data rate value to the fourth data rate value or the sixth data rate value;
   a link monitor coupled to the link rate control module and operable to:
      detect the first current usage rate of the first link; and
      detect a second current usage rate of the second link; and
   a first link rate policy accessible to the link rate control module and operable to store the first data rate value, the second data rate value, the third data rate value, and the fourth data rate value;
   wherein the link rate control module is operated to:
      detect a first current usage rate of the first link;
      access the first link rate policy to determine a link rate entry associated with the first current usage rate of the first link;
      in response to determining that the first current usage rate is less than the second data rate value and the fourth data rate value, to:
         direct the first link control logic module to alter the first link data rate from the first data rate value to the second data rate value based on the link rate entry; and
         direct the second link control logic module to alter the second link data rate from the third data rate value to the fourth data rate value based on the link rate entry and not based upon a second current usage rate of the second link, wherein directing the second link control logic module is in response to determining that the first link is coupled to the second link;
      in response to determining that the first current usage rate is greater than the second data rate value and the fourth data rate value, to maintain the first link data rate at the first data rate value, and to maintain the second link data rate at the third data rate value; and
      in response to determining that the second current usage rate is greater than the first data rate value and the third data rate value, the link rate control module is operated to:
         direct the first link control logic module to alter the first link data rate from the first data rate value to the fifth data rate value based on the first link rate policy; and
         direct the second link control logic module to alter the second link data rate from the third data rate value to the sixth data rate value based on the first link rate policy.

2. The network communication device of claim 1, further comprising:
   a link controller operable to operate the first link at 1 Gbps and 10 Gbps;
   wherein:
      the link monitor is further operable to detect the first current usage rate being less than 1 Gbps; and
      the link rate control module is further operated to:
         detect that the first link data rate is 10 Gbps;

access the link policy to determine the second data rate value is 1 Gbps; and
direct the first link control logic module to alter the first link data rate from 10 Gbps to 1 Gbps.

3. The network communication device of claim 1, further comprising a link rate policy management entity operable to update the first link rate policy with a second link rate policy.

4. The network communication device of claim 1, further comprising an Ethernet Energy Efficient (EEE) enabled link controller.

5. The network communication device of claim 1, wherein further the first link comprises a peripheral connect interface Express enabled interface.

6. A method of managing network links comprising:
accessing a link policy of a communication device to detect a first data rate entry, the link policy being operable to enable use of a first link of the communication device, and a second link of the communication device;
detecting a first current usage rate of the first link;
detecting a first link data rate of the first link;
comparing the first link data rate to the current usage rate;
updating the first link data rate of the first link in response to the comparison;
updating the second link data rate of the second link to the first data rate entry in response to the comparison, but not in response to a second current usage rate of the second link;
maintaining the first link data rate and the second link data rate if the first current usage rate is less than the first data rate entry;
increasing the first link data rate and the second link data rate if the first current rate usage rate is greater than the first data rate entry;
detecting a second data rate entry within the link policy;
comparing the second data rate entry to the first current usage rate; and
updating the first link data rate and the second link data rate to the second data rate entry.

7. The method of claim 6, comprising:
detecting the first current usage rate is less than the first data rate entry; and
updating the first link data rate and the second link data rate to the first data rate entry in response to the first current usage rate being less than the first data rate entry.

8. The method of claim 6, further comprising:
detecting an idle link usage rate of the first link;
detecting the first link data rate is 10 Gbps;
accessing the link policy of the first link to determine that the first data rate entry is 1 Gbps; and
updating the first link data rate and the second link data rate to 1 Gbps.

9. The method of claim 6, further comprising:
detecting that the first current usage rate of the first link is increasing;
detecting the first link data rate is 1 Gbps;
accessing the link policy of the first link to determine that the first data rate entry is 10 Gbps;
updating the first link data rate and the second link data rate to 10 Gbps.

10. The method of claim 6, further comprising:
receiving a link policy update;
accessing the link policy;
updating the link policy using the link policy update; and
enabling use of the first link and the second link using the link policy update.

11. The method of claim 10, further comprising:
generating the link policy update using a link policy management entity;
receiving an operating status of at least one link from a link management system;
detecting whether to update the link policy; and
generating the link policy update in response to the detecting.

12. A non-transitory computer readable medium including instructions for carrying out a method of managing a supply chain, the method comprising:
accessing a link policy of a communication device to detect a first data rate entry, the link policy being operable to enable use of a first link of the communication device, and a second link of the communication device;
detecting a first current usage rate of the first link;
detecting a first link data rate of the first link;
comparing the first link data rate to the first current usage rate;
updating the first link data rate of the first link response to the comparison;
updating the second link data rate of the second link to the first data rate entry in response to the comparison, but not in response to a second current usage rate of the second link
maintaining the first link data rate and the second link data rate if the first current usage rate is less than the first link data rate entry;
increasing the first link data rate and the second link data rate if the first current rate usage rate is greater than the first link data rate entry
receiving a link policy update;
accessing the link policy;
updating the link policy using the link policy update; and
enabling use of the first link and the second link using the link policy update.

13. The non-transitory computer readable medium of claim 12, further comprising:
detecting the first current usage rate is less than the first link data rate entry; and
updating the first link data rate and the second link data rate to the first link data rate entry in response to the first current usage rate being less than the first link data rate entry.

14. The non-transitory computer readable medium of claim 12, further comprising:
detecting a second data rate entry within the link policy;
comparing the second data rate entry to the first current usage rate; and
updating the first link data rate and the second link data rate to the second data rate entry.

* * * * *